June 19, 1962 C. V. FIELDS ETAL 3,040,236
ELECTRICAL CONVERSION DEVICE
Filed March 5, 1958 2 Sheets-Sheet 1

WITNESSES:
Bernard R. Gieguey
Leon M. Garman

INVENTORS
Oliver P. Steele III and
Charles V. Fields.
BY
Donald Smith
ATTORNEY

United States Patent Office 3,040,236
Patented June 19, 1962

3,040,236
ELECTRICAL CONVERSION DEVICE
Charles V. Fields, Pittsburgh, and Oliver P. Steele III, Export, Pa., assignors to Westinghouse Electric Corporation, East Pittsburgh, Pa., a corporation of Pennsylvania
Filed Mar. 5, 1958, Ser. No. 719,410
14 Claims. (Cl. 321—50)

The present invention relates to means for converting direct current voltages into alternating current voltages, and more particularly to means of the character described for converting direct current into a very low frequency, polyphase alternating current.

In order to convert a source of direct current electric potential into a low frequency output adapted for use with relatively heavy loads, it has heretofore been the practice to use complicated arrangements of frequency converters and the like, which not only are expensive, but additionally are difficult to control and to maintain. For this reason prior equipment of this nature rendered it difficult to obtain a very low frequency alternating source of the character described which could be stopped precisely or rotated in either direction of phase rotation.

When converting electrical energy from a direct current source into an alternating current having a typical sine wave output, it has been necessary to employ the aforementioned frequency converter or complicated and costly A.C.-D.C. motor-generator combinations in order to obtain an alternating output approximating a true sine wave under full load conditions. In many such devices the alternating output instead of being sinusoidal in form, more closely resembled a saw-toothed wave form having sharp peaks and relatively flat sides. The sharp peaks of the latter mentioned wave form are undesirable in operating certain types of A.C. equipment, due to the heating effects and loss of torque. For this reason the alternating output of these prior devices could not be used directly as a power supply for various types of alternating current machinery. Instead the saw-toothed output, in one arrangement, had to be fed through the fields of a direct current generator whereupon a voltage wave was obtained which more closely approximated a true sine wave and which only then was adapted for heavy current loads. Moreover, very low frequency alternating current outputs were not obtainable due to loss of torque in the aforesaid motor-generator set at very slow rotative speeds.

In certain applications, a reluctance type electric motor, that is to say a motor having a windingless or salient pole type rotor, is employed in a hermetically sealed system. The rotor of the motor is enclosed within the system and accordingly, electric leads thereto are desirably eliminated. One form of the aforementioned electric motor is described in an application of Walter G. Roman et al., entitled "Linear Motor Device," Serial No. 496,668, filed March 25, 1955, Patent No. 2,780,740, issued February 15, 1957, and assigned to the assignee of the present application. When using this type of motor in the uses described in the aforementioned application, it is frequently necessary to rotate the rotor thereof at extremely slow speeds for example two to ten revolutions per minute. In a motor of this type it is impractical to wind the stator thereof with sufficient poles to obtain the aforementioned speeds. Accordingly, it is desirable to supply the stator or field of the motor with a very slowly rotating polyphasal alternating voltage. For proper operation of the motor, the alternations of the polyphase current must assume the form of a typical sine wave. Moreover, in several applications this type of motor must be stopped or reversed quickly by means of similar current changes in the stator thereof, which changes cannot be quickly and efficiently accomplished by conventional low frequency producing equipment.

Although commutator-type alternating voltage converters are well known, these prior devices frequently are adapted for producing only the aforementioned saw-toothed wave. In those commutator type devices in which a sinusoidal output is obtained, the arrangement of resistances associated therewith is such that an output approximating a true sine wave is obtained only under conditions of no load. These prior devices, then, are useful only with high impedance loads in which the impedance of the load is very much higher than that of the commutator type device. These devices consequently are not suited for applications wherein they are subjected to high current drains.

In view of the foregoing, it is an object of the invention to provide an inexpensive and efficient electrical current converting device.

Another object of the invention is to provide means for efficiently converting direct current into a polyphase alternating current, and more particularly a current of extremely low frequency.

A further object of the invention is to provide electrical current converting means which can be stopped or reversed quickly and precisely and in which the frequency of its output can be varied quickly and easily.

Another object of the invention is to provide alternating current converting means wherein the alternating output thereof closely approximates a true sine wave when the converting means is subjected to low-impedance loads.

Still another object of the invention is to provide electrical converting means of the character described having a sinusoidal polyphase output.

Another object of the invention is to provide electrical converting means in which the output thereof can be subjected to relatively high current drains without losing the sine-wave character thereof.

Yet another object of the invention is the provision of an electric converting means for transforming direct current to alternating current and the converse.

Another object of the invention is the provision of an improved commutator-type sine wave generator. More specific objects are to provide an improved commutator type converter adapted for use with low impedance loads and means associated with the commutator to facilitate operation thereof at very slow speeds and for quickly and easily changing or reversing these speeds.

These and other objects, features, and advantages of the invention will be made apparent as this description proceeds, with the description being taken in conjunction with the accompanying drawings wherein.

Figure 1:
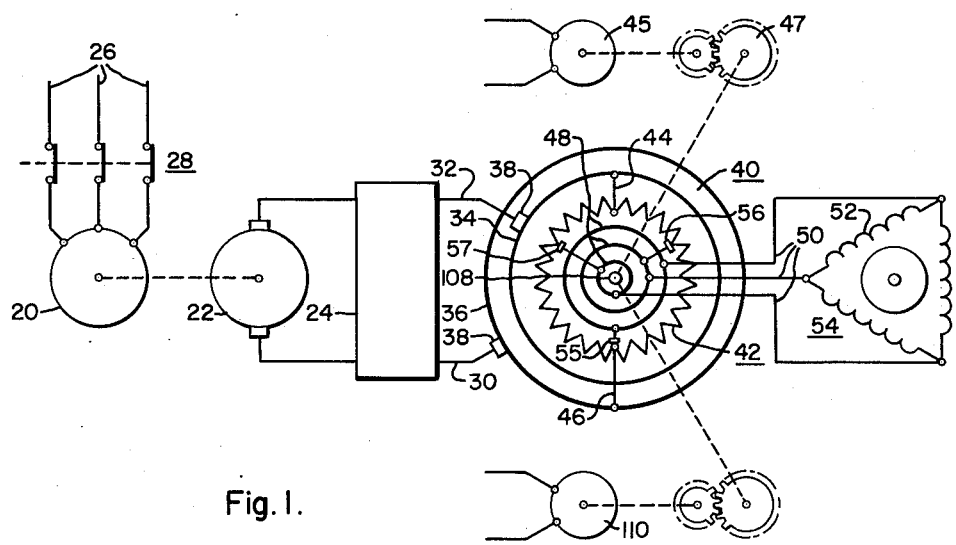
FIGURE 1 is a schematic circuit diagram of one form of electrical converting means arranged in accordance with this invention.

Referring more particularly to FIG. 1 of the drawings the exemplary form of the invention shown therein comprises a source of direct current potential, for example an alternator 20 driving a direct-current generator 22. Any pulsation or ripple in the direct current output of the generator 22 can be removed by a rectifying network 24 of conventional design, if desired. However at very low frequencies some ripple in the alternating output, presently to be described, can be tolerated. For operating the alternator 20 the same is coupled in this example to a conventional alternating current source indicated generally by conductors or buses 26. The alternating source usually has a frequency of 60 cycles, and the conductors 26 thereof are coupled to the alternator 20 through suitable switching means 28.

The output of the filter network 24 is connected through a pair of conductors 30 and 32 to individual outer slip rings 34 and 36. The slip rings 34 and 36, which are contacted by means of a pair of brushes 38 individually joined to the conductors 30 and 32, are secured adjacent the outer periphery of a rotatably mounted commutator device denoted generally by the reference character 40 and forming part of the afore-mentioned electrical converting means. An insulated circular base member presently to be described, is disposed inwardly and concentrically of the aforesaid slip rings 34 and 36 and is secured to the commutator 40 for rotation therewith. Mounted upon the insulated supporting member are a plurality of closely spaced commutator segments which are coupled electrically by suitable circuit means presently to be described in greater detail. The commutator segments and the aforesaid associated circuitry are represented generally by a circular resistance network 42. In this arrangement, two diametrically opposed points of the aforesaid resistance network are secured individually to a pair of conductors 44 and 46. The latter conductors are in turn connected respectively to the outer slip rings 34 and 36 whereby positive and negative direct-current potentials are applied continuously to the resistance network 42 as the commutator 40 is being rotated. In one arrangement, the commutator 40 is rotated rather slowly by an electric motor 45, shown schematically in FIG. 1 and provided with known speed reduction means denoted by the reference character 47.

The commutator 40 is furnished in addition with a plurality of inner slip rings likewise mounted concentrically of the resistance network 42. The inner slip rings correspond to the number of phases of the alternating output and in this example three such rings 48 are employed and coupled through conductors 50 to a delta-connected field or stator 52 of a low frequency motor or other current utilizing device 54. These inner slip rings 48 are connected individually to brushes 55, 56 and 57 similar type electrical contacts, via conductors 49, 51, or 53, respectively, with the brushes and conductors being equal in number to that of the inner slip rings 48. The brushes are mounted at spaced positions relative to the inner slip rings 48 within the resistance network 42 by suitable means such that the brushes 55, 56, and 57 each make successive electrical contact with individual segments of the resistance network 42 in order to produce a three-phase alternating output voltage. In this example, the brushes are spaced equidistantly or 120° apart about the inner periphery of the resistance network 42.

As described hereinafter in more detail, either or both the inner slip rings 48 and the resistance network 42 can be rotated about their common axis 108. Alternatively, both the resistance network 42 and the inner slip rings 48 can be held stationary, and the conductors 49, 51 and 53 and brushes 55, 56, and 57 together with additional brushes (not shown) attached to the inner ends of the conductors, can be rotated about the axis 108 while suitably engaging the resistance network 42 and the inner slip rings 48. It will be appreciated as this description proceeds that additional groups of inner slip rings 48 of associated brushes can be provided for six or nine phase outputs, or the like, in the event it is desired to couple more than one polyphase current utilizing device to the commutator 40 in non-parallel array. The one or more groups of inner slip rings 48 desirably are mounted for rotation independently of the outer slip rings 34 and 36 and the commutator 40 for reasons elaborated upon hereinafter in connection with FIG. 2 of the drawings.

Figure 2:
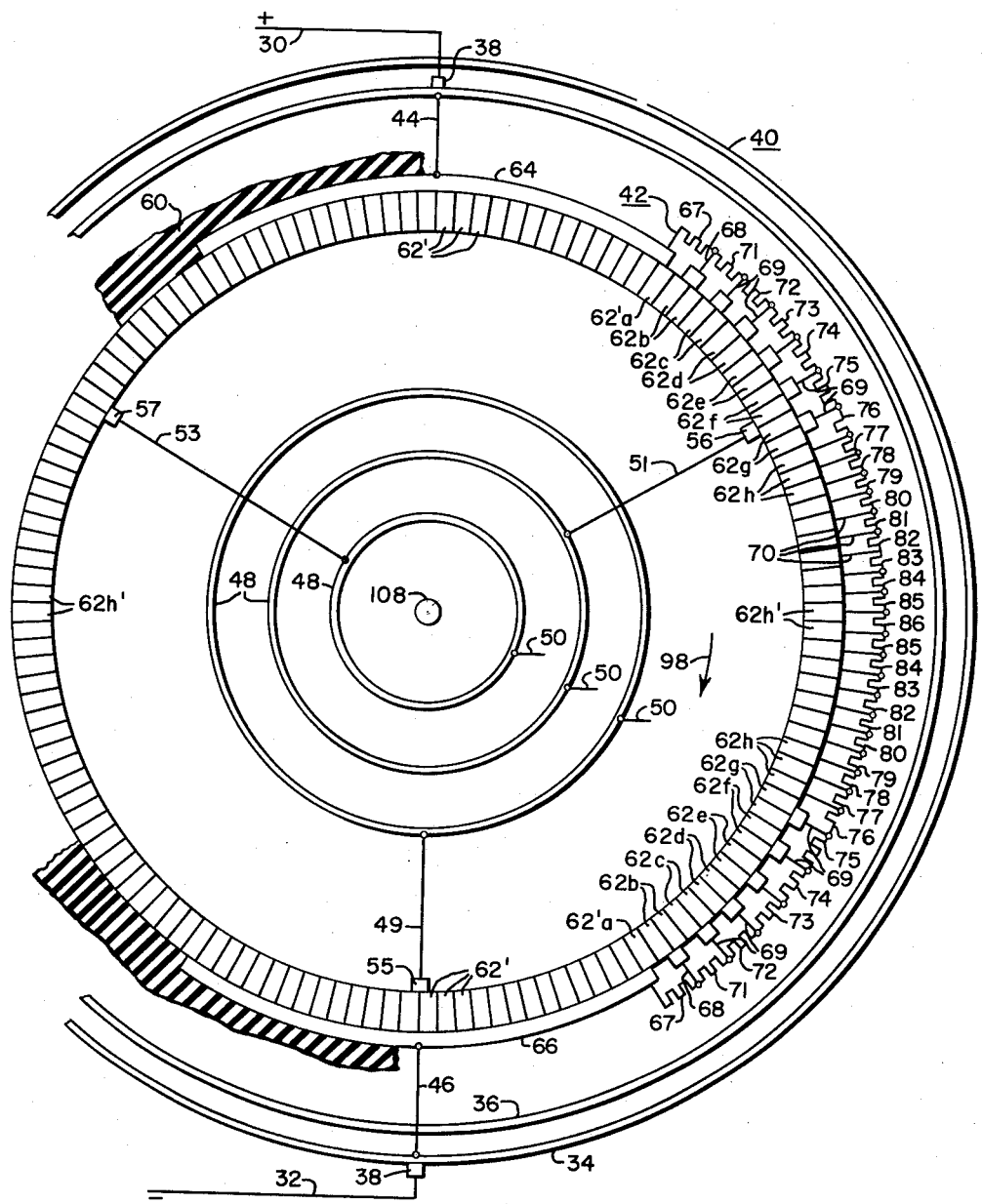
FIG. 2 is a schematic structural and circuit diagram of the converting means illustrated in FIGURE 1 and showing various electrical relationships between the components of the converting means.

In FIG. 2 of the drawings the structural arrangement of the commutator means 40 of FIG. 1 is illustrated in greater detail. As indicated heretofore, the converting or commutating means 40 comprises outer slip rings 34 and 36 and inner slip rings 48, the function of which in one arrangement has been described heretofore. The resistance network 42 interposed between the outer slip rings 34 and 36 and the inner slip rings 48 includes a generally circular insulating base member 60 and a plurality of commutator segments 62. The commutator segments 62', which in this example of the invention number one hundred forty-two, are spaced about the inner periphery of the base member 60. Although these commutator segments are illustrated as relatively closely spaced, they are electrically insulated either by providing air spaces or electrical insulation (not shown) therebetween.

Adjacent each of the outer slip ring conductors 44 and 46 a group of the commutator segments 62' are mounted upon a common conductor 64 or 66, respectively. These common conductors 64 and 66 can be provided in the form of conductive strips. The aforesaid outer slip ring conductors 44 and 46 are electrically connected to the conductive members 64 and 66, respectively. For purposes hereinafter to be pointed out, approximately twenty-eight of the segments 62' are secured in electrically conductive relationship to each of the conductive members 64 and 66. In other applications of the invention the conductive members can be added as conductive coatings deposited upon the insulating member 60 or otherwise mounted upon or forming part of the insulating member.

Between the endmost ones of the segments 62'a and the adjacent ones 62b of the group of segments 62 not connected directly to the conductive members 64 and 66, resistance elements 67, are connected in electrical series therewith. The resistance elements 67 desirably are coupled individually between the common conductors 64 or 66, as the case may be, and branched conductors 68, which in turn are connected each to a pair the aforesaid commutator segments 62b. This arrangement has the effect of connecting a resistance element 67 between each pair of adjacent segments 62b and the adjacent one of the slip ring conductors 44 and 46 through the associated one of the common conductors 64 or 66. To the remaining pairs of commutator segments 62c, 62d, 62e, 62f, 62g are coupled individually an equivalent number of branched conductors 69. Additional resistances, indicated respectively by reference characters 71 to 75 inclusive, are then connected between adjacent ones of the branched conductors 68 and 69, with the value of each of the resistances 71 to 75 varying in accordance with their location about the outer periphery of the resistance network 42. The resistances 71 to 75 thus are connected between adjacent pairs of segments 62b–62g, inclusive. The remainder of the commutator segments 62h of each quadrant are connected individually to leads 70, and resistances 76 to 85 inclusive are connected between adjacent ones of the segments 62h and of the pair of segments 62g via the conductors 70. One each of the resistances 67 and 71–85, inclusive, are therefore employed in each quadrant of the resistance network 42. A remaining resistance 86 is coupled via conductors 70' between each pair of segments 62h' which are disposed respectively at the 90° and 270° positions of the resistance network 42.

In this arrangement of the invention, then, four each of the aforesaid resistances 67 and 71–85 are utilized as indicated in FIG. 2 of the drawings, while two of the resistances 86 are required. The resistances 67 and 71–85 inclusive are disposed in two groups of adjacent ascending and descending series about the periphery of the converting means 40, with the value of their electrical resistance increasing generally with the ordinal value of their associated reference characters to the highest valued resistance 86, which is disposed at the midpoint in each group of the ascending and descending series. In this arrangement of the invention, a differing value of resistance is provided between each adjacent pair of commutator segments 62 with the exception of those segments 62' which are connected as aforesaid directly to the conductive members 64 and 66. In the case of the latter segments 62', the resistance between individual ones thereof is close to zero in this arrangement of the invention.

In this example of the invention where it is desired to obtain an alternating output from the converting means 40, which output corresponds closely to a sine wave configuration, the aforesaid resistances 67 and 71–86 inclusive are furnished with the individual resistance values indicated in the following table:

| Resistor: | Ohmic value |
| --- | --- |
| 67 | .010 |
| 71 | .0125 |
| 72 | .0477 |
| 73 | .0568 |
| 74 | .101 |
| 75 | .23 |
| 76 | .30 |
| 77 | .40 |
| 78 | .50 |
| 79 | .60 |
| 80 | .70 |
| 81 | .80 |
| 82 | .90 |
| 83 | .90 |
| 84 | 1.15 |
| 85 | 2.30 |
| 86 | 2.50 |

As indicated heretofore, the four groups of the aforesaid resistances 68 and 74 to 84 are disposed about the periphery of the resistance network 42, such that those resistances having the highest ohmic values, namely the resistors 86, are disposed at diametrically opposed positions in the circular resistance network 42. Moreover, each pair of resistors 86 are arranged at a position equidistant from the outer slip ring conductors 44 and 46 through which positive and negative direct current potentials are applied to the resistance network 42 by means of the conductors 30 and 32 and other components of the electrical converting device 40, which are described heretofore in connection with FIGURE 1 of the drawings.

The positions and ohmic values of the aforementioned resistances 67 and 71–86 are in part calculated and in part empirically arranged such that a sinusoidal output approximating a true sine wave is obtained at the full load condition. In the arrangement of the invention described herein, it has been found that the output of the commutator device 40 very closely approximates a true sine wave when the impedance of the load is about one-half of the total resistance inserted in each quadrant of the circular resistance network 42. For practical purposes, however, the output sufficiently approximates a sine wave when the impedance of the load is of the same order of magnitude as that of each quadrant of the resistance network 42. It should be pointed out that a greater or lesser number of commutator segments 62 can be employed, depending upon the character of output desired as to ripple and accuracy. When employing substantially less than one hundred forty-two segments however it is desirable to increase the value of resistances adjacent the 90° and 270° positions in the resistance network 42 in order to lessen the current drain of the network.

Figure 3:
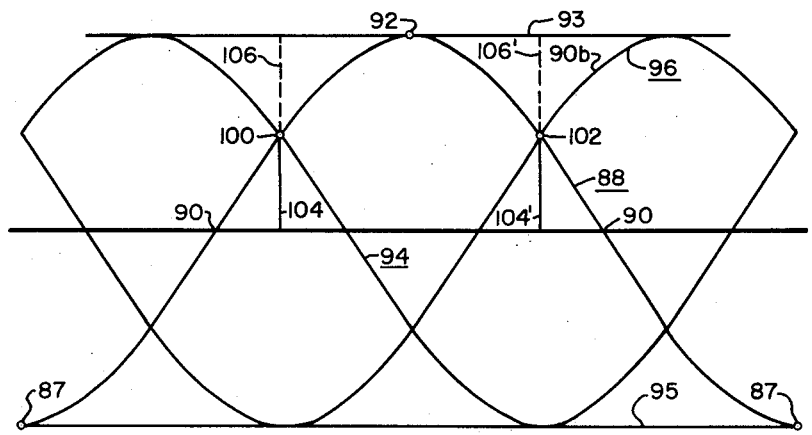
FIG. 3 is a graphical illustration of a given sinusoidal output obtained from the electrical converting means illustrated in FIGS. 1 and 2 of the drawings.

As better shown in FIGS. 2 and 3 of the drawings, the position occupied by the inner brush 55 corresponds to the minimum values (or maximum negative values) 87 of associated sine wave 88 (FIG. 3) of the polyphased output of the commutator device 40. This value of the sine wave 88 corresponds substantially to that of the negative direct current potential supplied by the bus 32 to the common conductor 66 and its associated commutator segments 62'. The zero values 90 of the sine wave 88 occur when the inner brush 55 is disposed in positions (not shown) respectively, in contact with the segments 62h' connected respectively to the highest valued resistors 86. As the brush 55 moves around the inner periphery of the commutator segments 62, the maximum positive value, as indicated by the point 92 on the sine wave 88, is attained when the associated brush comes into contact with one of the segments 62' secured to the other common conductor 64 and in turn to the positive direct current bus 30. The approximate potentials of the positive and negative buses 30 and 32 are represented, of course, by horizontal lines 93 and 95 respectively. In a similar manner the high, low, and zero points of sine waves 94 and 96 are induced by corresponding positions of the brushes 56 and 57, respectively. As the brushes 55, 56, and 57 come into contact with successive segments of the converting means 40 the instantaneous output potential of the associated sine waves 88, 94, and 96 will depend upon the current drop at the related point within the resistance network 42 as determined by the collective value of the resistances connected between the commutator segment corresponding to that point and the adjacent positive or negative bus 30 or 32, with the electrical sign of this instantaneous value being that of the nearest direct current bus 30 or 32.

In the arrangement illustrated in FIGS. 1 and 2, the electrical converting device 40 is arranged for producing, as aforesaid, a polyphase output comprising three sinusoidal waves 88, 94, and 96 which are disposed 120 electrical degrees apart as determined by the disposition of the associated brushes 55, 56, and 57 respectively. With the position of these brushes being that shown in FIG. 2 of the drawings and with the resistance network 42 and associated commutator segments 62 being rotated clockwise as indicated by arrow 98, the instantaneous positions of the brushes 56 and 57 correspond to the points 100 and 102 of the sine waves 94 and 96, respectively. Thus the instantaneous value of the sine wave 94 (brush 56) while positive and decreasing toward zero, is equal, under substantially full load conditions, to the positive value of the applied direct current potential minus the resistance drop in the resistors 67 and 71–74 inclusive. The instantaneous voltage at this point is indicated by the vertical line 104 of FIG. 3, while the resistance drop is shown by the dashed line 106.

The aforementioned and other resistance drops associated individually with the commutator segments 62 are calculated to produce outputs closely conforming with true sine waves when a substantial load is applied to the resistance network 42, thus the value of the resistance drops are made primarily to depend on the load current. On the other hand, the output sine wave 96 produced by relative movement between the brush 57 and the resistance network 42, is increasing toward its maximum positive value but has the same instantaneous value in the position shown in FIG. 2, as that of the sine wave 94. This value is indicated by the point 102, as aforesaid, of the sine wave 96 and the instantaneous value thereof is determined, as shown by lines 104' and 106', in the same manner as that described heretofore in connection with the point 100 of the sine wave 94.

It will be seen from the foregoing explanation that each of the sine waves 88, 94, and 96 are close approximations of true sine waves when the converting means 40 is arranged for producing a typical alternating current output. However, it is obvious, on a theoretical basis that only one of the commutator segments 62' should be connected, with a substantially zero resistance path, directly to each positive and negative bus 30 and 32. On the other hand because of the exceedingly small resistance values which would otherwise be required between adjacent ones of each group of commutator segments 62', these resistances have been omitted and the commutator segments 62' are coupled, as described heretofore, directly to the common conductors 64 and 66. The extremely low resistance values that would be required are indicated by the value of the lowest valued resistors 67 shown in the foregoing table.

In those applications where an even closer approximation of a true sine wave is desired, the common conductors 64 and 66 desirably are fabricated from a material having an ohmic resistance of approximately that of each resistor 67 so that the resistance between the endmost segment 62'a and the mid-point of each conductive member 64 or 66 to which the outer slip ring conductors 44 and 46 are connected will be approximately equal to one-half the resistance existing between the adjacent commutator segments 62'a and 62b. Accordingly, these conductive members provide a correspondingly lesser resistance between the brushes 55, 56, or 57 and the aforesaid outer slip ring conductors as the median one of each group of these segments 62' approaches one of the brushes 55 to 57. With this latter arrangement of the invention, a still closer approximation of a true sine wave is obtained. The latter-mentioned conductive members, in this arrangement, if desired, can be tapered toward their ends to produce a non-linear resistance drop as the respective brushes 55 to 57 successively engage the segments 62' secured between these ends and the midpoint of each conductive member.

When operating the electrical converting means (FIGS. 1 and 2) of the invention, the outer slip rings 34 and 36 and the resistance network 42, including the segments 62 are rotated by the driving motor 45. In this case the brushes 55, 56, and 57 can be supported in stationary positions, desirably 120° apart, and the output leads 50 can be connected directly thereto upon eliminating the inner slip rings 48. Alternatively, the resistance network 42 can be mounted in a stationary position and the brushes 55 to 57 and the inner slip rings 48 rotated relative thereto. In the latter arrangement, of course, the outer slip rings 34 and 36 can be excluded and the input leads 32 and 30 can be connected directly to the conductors 44 and 46, respectively. It is also contemplated that both the resistance network 42 and associated components, and the inner brushes 55, 56, and 57 and associated components can be rotated about their common axis 108 (FIGS. 1 and 2), by means for example of the electric motor 45 and another driving means 110 (FIG. 1). When an output having a very low alternating frequency is desired the respective rotations are effected at differential speed in the same direction, while very high frequencies can be attained by rotations in differing directions. In each mode of operation, however, a direct current holding potential can be applied to the armature or rotor of the alternating current device coupled to the output or outputs of the electrical converting means, simply by terminating relative movement between the brushes 55, 56, and 57 and the resistance network 42.

From the foregoing, it will be apparent that novel and efficient forms of electrical converting devices have been disclosed herein. These devices are adapted to convert a direct current potential applied thereto to an alternating output having a sinusoidal wave form. Moreover, the alternating output of these devices can be furnished in any convenient number of phases, although these devices have been described particularly in connection with arrangements for producing a three-phase output having wave forms corresponding to sine wave spaced 120 degrees apart. It will be readily understood that a differing phasal relationship can be obtained by suitable positional redistribution of the inner brushes 55, 56, and 57. Moreover, wave forms of a different form are attainable by providing resistances corresponding to the resistors 68 and 74 to 84 inclusive but having ohmic values varied in accordance with a differing non-linear relationship.

Accordingly, numerous modifications will occur to those skilled in the art without departing from the spirit and scope of the present invention. Moreover, it is to be understood that certain features of the invention can be employed without a corresponding use of other features thereof.

Therefore, what is claimed as new is:

1. Electrical converting means for converting a direct current potential into an alternating potential, said means comprising a plurality of electrically conductive segments mounted in adjacent relationship, means for making successive contact with said segments, at least some of said segments being insulated electrically from adjacent segments, an electrical resistance network including a plurality of resistances inserted individually between adjacent ones of said insulated segments in electrical contact therewith, the ohmic values of said resistances being varied selectively in accordance with the impedance of the load of said converting means to produce a sine-wave characteristic in said alternating potential when said converting means is under load, and means for connecting a source of said direct current potential to spaced points in said resistance network.

2. Electrical converting means for converting a direct current potential to an alternating potential, said means including a plurality of electrically conductive segments, means for mounting said segments in a closely spaced circular array, some of said segments being electrically insulated from adjacent segments, the remainder of said segments being connected electrically to a pair of conductive members, a resistance network coupled to said conductive members and including individual resistances inserted respectively between adjacent ones of said insulated segments, the ohmic values of said resistances being varied selectively to produce a sinusoidal output for said converting means when the latter is under load, said resistors being chosen to approximate the condition wherein the ohmic value of the resistors in each quadrant equals between one and two times the impedance of the load of said converting means, and circuit means for connecting a source of said direct current potential to said conductive members.

3. In combination, electrical converting means for converting a direct current potential to an alternating potential, load means electrically coupled to said converting means, said converting means including a supporting member, a plurality of electrically conductive segments mounted in a closely spaced array upon said member, at least some of said segments being electrically insulated from adjacent segments and from said supporting member, a resistance network including a plurality of resistances connected individually between adjacent ones of said insulated segments, the ohmic values of said resistances being varied in accordance with the impedance of said load means to produce said alternating potential when said converting means is under load, means for applying said direct current potential being converted to spaced points of said resistance network, means for successively and electrically contacting said segments, means coupled to each of said supporting member and said contacting means for moving said supporting member and said contacting means at differential speeds, said contacting means being electrically coupled to the input of said load means, and means for connecting spaced points of said resistance network to a source of said direct current potential.

4. Electrical converting means for converting a direct current potential to an alternating potential, said means comprising a supporting member having elongated conductive portions having a varying resistance per unit length along their longitudinal dimensions, respectively, a plurality of electrically conductive segments, means for mounting said segments in a closely spaced array about the periphery of said supporting member, said segments being electrically insulated from adjacent segments, some of said segments being electrically insulated from said conductive portions with the remainder of said segments being electrically connected to said conductive portions, an electrical resistance network coupled to said conductive portions and including a plurality of resistance elements connected individually between adjacent ones of said insulated segments, the ohmic values of said elements being varied in accordance with the impedance of the load of said converting means, means for successively and electrically contacting said segments, and means for applying an electric potential to be converted to said conductive portions.

5. Electrical converting means for converting a direct current potential to an alternating potential, said means including a generally circular supporting member having a pair of diametrically spaced conductive portions, a plurality of electrically conductive segments, means for mounting said segments in a closely spaced array about the periphery of said supporting member, those segments adjacent said conductive portions being electrically connected thereto, the remainder of said segments being insulated from adjacent segments and from said conductive portions, a resistance network connected to said conductive portions and including a plurality of resistance elements connected individually between said conductive portions and adjacent ones of said insulated segments and additionally between adjacent ones of said insulated segments, the ohmic values of said resistance elements varying in magnitude in accordance with the impedance of the load of said converting means to produce said alternating potential under load conditions, electrical contacting means for successively and electrically engaging each of said segments, means for rotating both said supporting member and said contacting means at preselected speeds and in preselected directions to provide a range of frequencies for said alternating potential, and means for applying said direct current potential to said conductive portions.

6. Electrical converting means for converting a direct current potential to an alternating potential, said means including a generally circular supporting member having a pair of diametrically spaced conductive portions, a plurality of electrically conductive segments, means for mounting said segments in a closely spaced array about the periphery of said supporting member, those segments adjacent said conductive portions being electrically connected thereto, the remainder of said segments being insulated from adjacent segments and from said conductive portions, a resistance network connected to said conductive portions and including a plurality of resistance elements connected individually between said conductive portions and adjacent ones of said insulated segments and additionally between adjacent ones of said insulated segments, the total ohmic resistances of said conductive portions being of the order of those resistance elements connected to said conductive portions, the ohmic values of said resistance elements varying in magnitude in accordance with the impedance of the load of the converting means to produce said alternating potential when said converting means is under load, electrical contacting means for successively and electrically engaging each of said segments, means for rotating both said supporting member and said contacting means at preselected speeds and in preselected directions to provide a range of frequencies for said alternating potential, and means for applying said direct current potential to said conductive portions.

7. Electrical converting means for converting a direct current potential to an alternating potential, said means including a generally circular supporting member having a pair of diametrically spaced conductive portions, a plurality of electrically conductive segments, means for mounting said segments in a closely spaced array about the periphery of said supporting member, those segments adjacent said conductive portions being electrically connected thereto, the remainder of said segments being insulated from adjacent segments and from said conductive portions, a resistance network connected to said conductive portions and including a plurality of resistance elements connected individually between said conductive portions and adjacent ones of said insulated segments and additionally between adjacent ones of said insulated segments, the total ohmic resistances of said conductive portions being of the order of those resistance elements connected to said conductive portions, said conductive members being of elongated configuration extending in the circumferential direction of said supporting member and having a varying resistance per unit length along its longitudinal dimensions, the ohmic values of said resistance elements varying in magnitude in accordance with the impedance of the load of said converting means to produce said alternating potential when said converting means is under load, electrical contacting means for successively and electrically engaging each of said segments, means for rotating both said supporting member and said contacting means at preselected speeds and in preselected directions to provide a range of frequencies for said alternating potential, and means for applying said direct current potential to said conductive portions.

8. Electrical converting means for converting a direct current potential to an alternating potential, said means including a plurality of electrically conductive segments, means for mounting said segments in a closely spaced generally circular array, some of said segments being electrically insulated from adjacent segments, the remainder of said segments being connected electrically to a pair of conductive members, a resistance network coupled to said conductive members and including individual resistances inserted respectively between adjacent ones of said insulated segments, the ohmic values of said resistances being varied in accordance with the impedance of the load of converting means to produce said alternating potential when said converting means is under load, a pair of slip rings electrically connected to said conductive members, respectively, contacting means engaging said slip rings for coupling said slip rings to a source of said direct current potential, a plurality of additional slip rings, additional contacting means connected to said last-mentioned slip rings respectively for successively and electrically engaging said segments, said last-mentioned contacting means being mounted in a spaced generally circular array, and means for rotating each of said mounting means, and first-mentioned slip rings and said additional contacting means and slip rings at differential speeds.

9. Electrical converting means for converting a direct current potential into a fluctuating potential, said means comprising a plurality of electrically conductive segments mounted in adjacent relationship, means for making successive contact with said segments, at least some of said segments being insulated electrically from adjacent segments, an electrical resistance network including a plurality of resistances inserted individually between adjacent ones of said insulated segments in electrical contact therewith, means for connecting spaced points of said resistance network to a source of said direct current potential, and means for successively and electrically engaging said segments to supply said fluctuating potential to a load device, the ohmic values of said resistances being varied selectively in accordance with the impedance of the load of said converting means to produce said fluctuating potential when said load device is connected to said segment-engaging means.

10. Electrical converting means for converting a direct current potential to an alternating potential, said means including a plurality of electrically conductive segments, means for mounting said segments in a closely spaced array, a pair of spaced conductive members secured to said mounting means, some of said segments being electrically connected to said conductive members, a resistance network coupled to said conductive members and including a plurality of resistance elements, some of said resistance elements being coupled to adjacent pairs of the remaining segments, the remainder of said resistance elements being connected to single ones of said remaining segments, the ohmic values of said resistance elements being varied in accordance with the impedance of the load of converting means to produce said alternating potential when said converting means is under load, circuit means for connecting a source of said direct current potential to said conductive members, segment contacting means located to respectively engage all of said segments and additional circuit means connected to said segment contacting means for providing an alternating current output.

11. Electrical converting means for converting a direct current potential to an alternating potential, said means including a plurality of electrically conductive segments, means for mounting said segments in a closely spaced array, a pair of spaced conductive members secured to said mounting means, some of said segments being electrically connected to said conductive members, a resistance network coupled to said conductive members and including a plurality of resistance elements, some of said resistance elements being coupled to adjacent pairs of the remaining segments, said last-mentioned segment pairs being disposed adjacent said conductive members, the remainder of said resistance elements being connected to single ones of said remaining segments, the ohmic values of said resistance elements being varied in accordance with the impedance of the load of converting means to produce said alternating potential when said converting means is under load, circuit means for connecting a source of said direct current potential to said conductive members, segment contacting means located to respectively engage all of said segments and additional circuit means connected to said segment contacting means for providing an alternating current output.

12. Electrical converting means for converting a direct current potential to an alternating potential, said means including a supporting member, a plurality of electrically conductive segments disposed on said supporting member, a resistance network including a plurality of resistances selectively connected to said segments, means for applying said direct current potential to spaced points of said resistance network, means for successively and electrically contacting said segments, output means coupled to said contacting means, and means coupled to each of said supporting member and said contacting means for moving said supporting member and said contacting means individually at different speeds.

13. In combination, electrical converting means for converting a direct current potential to a predetermined fluctuating potential, said converting means having an input means and an output means, load means having its input electrically coupled to said output means, said converting means including a supporting member having a plurality of conductive segments mounted thereon, a resistance network selectively coupled to said segments, said input means of said converting means being electrically connected to spaced points of said resistance network, means for successively and electrically contacting said segments, said contacting means being electrically coupled to said output means, and said resistance network having resistive values therein selectively varied in accordance with the magnitude of the impedance of said load to provide said predetermined fluctuating potential when said converting means is under load.

14. Electrical converting means for converting a direct current potential to an alternating potential, said means including a generally circular supporting member, a plurality of electrically conductive segments, means for mounting said segments in a closely spaced array about the periphery of said supporting member, at least a portion of said segments being insulated from adjacent segments, a resistance network including a plurality of resistance elements connected individually between adjacent ones of said insulated segments, electrical contacting means for successively and electrically engaging each of said segments, means for rotating both said supporting member and said contacting means at preselected speeds and in preselected directions to provide a range of frequencies for said alternating potential, and means for applying said direct current potential to said resistance network.

References Cited in the file of this patent

UNITED STATES PATENTS

| 2,389,507 | Hansen | Nov. 20, 1945 |
| 2,493,354 | McCoy et al. | Jan. 3, 1950 |

FOREIGN PATENTS

| 820,766 | Germany | Nov. 12, 1951 |
| 825,716 | Germany | Dec. 20, 1951 |
| 930,099 | Germany | July 11, 1955 |